(12) United States Patent
Lehto et al.

(10) Patent No.: US 8,596,934 B2
(45) Date of Patent: Dec. 3, 2013

(54) MILLING INSERT, A TOOL AND A DEVICE FOR MILLING

(75) Inventors: Ralf Lehto, Gävle (SE); Rickard Sundström, Älta (SE); Johan Bergquist, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 161 days.

(21) Appl. No.: 13/212,367

(22) Filed: Aug. 18, 2011

(65) Prior Publication Data
US 2012/0051850 A1 Mar. 1, 2012

(30) Foreign Application Priority Data
Aug. 27, 2010 (SE) ...................................... 1050877

(51) Int. Cl.
*B23C 5/20* (2006.01)
(52) U.S. Cl.
USPC .................................. 407/42; 407/33; 407/113
(58) Field of Classification Search
USPC ................ 407/30, 34, 35, 42, 43, 61, 62, 113
See application file for complete search history.

(56) References Cited

U.S. PATENT DOCUMENTS

| | | | | |
|---|---|---|---|---|
| 4,588,332 A | * | 5/1986 | Komanduri et al. | 407/114 |
| 5,348,426 A | * | 9/1994 | Krupp | 407/40 |
| 5,632,576 A | | 5/1997 | Storch | |
| 5,915,888 A | * | 6/1999 | Minicozzi | 407/54 |
| 5,951,213 A | * | 9/1999 | Fauser et al. | 407/35 |
| 6,497,540 B1 | | 12/2002 | Shikata et al. | |
| 6,607,333 B2 | * | 8/2003 | Satran et al. | 407/33 |
| 7,226,249 B2 | * | 6/2007 | Tsuchitani et al. | 407/42 |
| 7,402,004 B2 | * | 7/2008 | Tanaka et al. | 407/53 |
| 7,419,336 B2 | * | 9/2008 | Lehto et al. | 407/35 |
| 7,775,750 B2 | * | 8/2010 | Satran et al. | 407/113 |
| 7,794,182 B2 | * | 9/2010 | Lehto et al. | 407/35 |
| 7,862,263 B2 | * | 1/2011 | van Iperen | 407/60 |
| 8,061,396 B2 | * | 11/2011 | MacLennan et al. | 144/363 |
| 2009/0245946 A1 | | 10/2009 | Maeda | |
| 2011/0008112 A1 | * | 1/2011 | Abe | 407/42 |

FOREIGN PATENT DOCUMENTS

| | | |
|---|---|---|
| EP | 1 252 955 | 10/2002 |
| EP | 0 985 478 | 11/2004 |
| JP | 2005-319558 | 11/2005 |
| WO | 00/29153 | 5/2000 |

* cited by examiner

*Primary Examiner* — Andrea Wellington
*Assistant Examiner* — Sara Addisu
(74) *Attorney, Agent, or Firm* — Morgan, Lewis & Bockius LLP

(57) ABSTRACT

Milling insert and tool for center cutting milling of material. At least one first cutting edge is terminated in or adjacent to a center axis defined by the milling insert and includes a first cutting edge portion having a first radius that is essentially equally great for each point of the first cutting edge portion. The first cutting edge includes at least one second cutting edge portion that is plane or has at least one second radius for each point of the respective second cutting edge portion, the at least one second radius being greater than the first radius and that is situated between the first cutting edge portion and the center axis. One second cutting edge portion adjoins the first cutting edge portion, and one second cutting edge portion is terminated in or adjacent to the center axis.

40 Claims, 6 Drawing Sheets

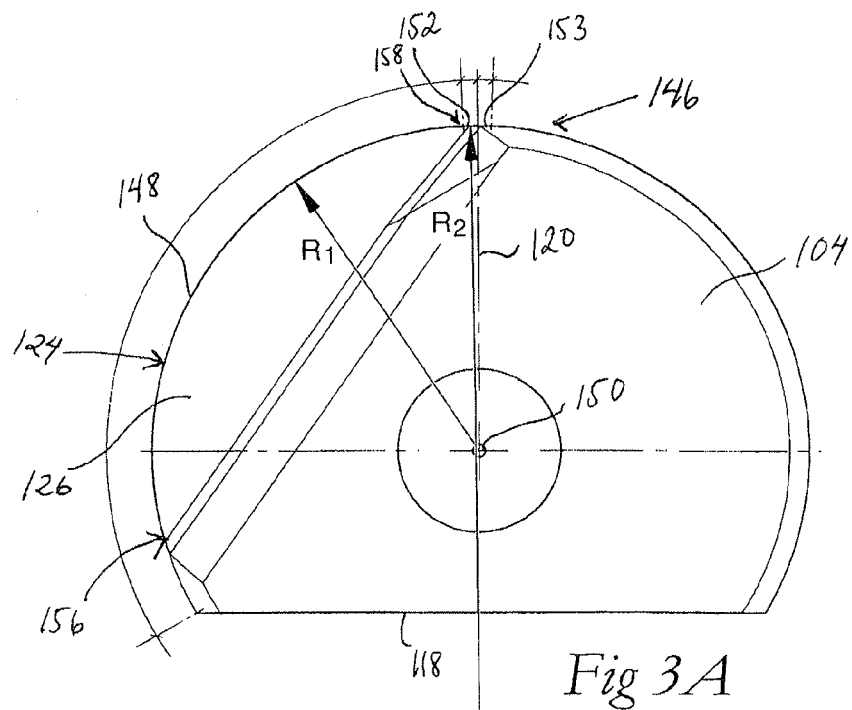
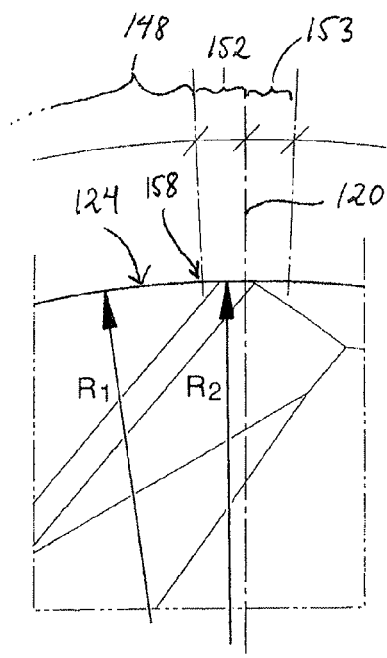 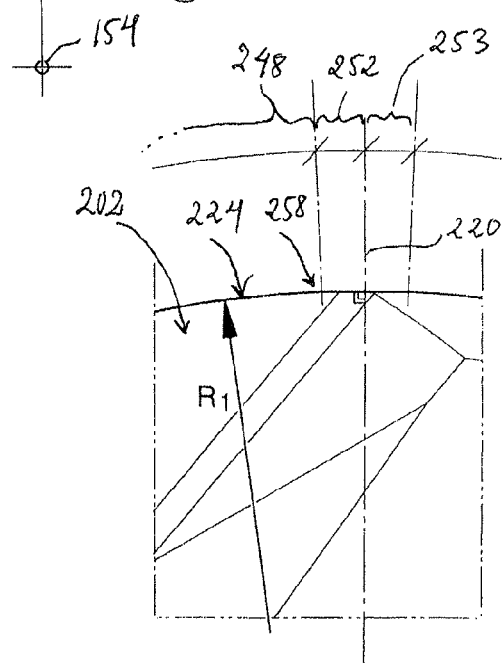

MILLING INSERT, A TOOL AND A DEVICE FOR MILLING

This application claims priority under 35 U.S.C. §119 to Swedish Patent Application No. 1050877-8, filed on Aug. 27, 2010, which is incorporated by reference herein in its entirety.

TECHNICAL FIELD

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

The present disclosure relates generally to a milling insert for center cutting milling of material, for instance titanium, steel, aluminum, casting or another material, which milling insert is arranged to be arranged in a seat that is defined by a milling cutter body and situated at a rotation axis defined by the milling cutter body, the milling cutter body being connectable to a rotatable spindle or holder, and the milling insert includes a plurality of cutting edges, where at least one first cutting edge of the plurality of cutting edges is terminated in or adjacent to a center axis that is defined by the milling insert and, when the milling insert is arranged in the seat, intended to coincide with the rotation axis of the milling cutter body, the first cutting edge including a first cutting edge portion having a first radius that is essentially equally great for each point of the first cutting edge portion. The present disclosure also relates generally to a tool for center cutting milling of material provided with milling inserts of the above mentioned kind. The present disclosure further relates generally to a device for center cutting milling of material, including a milling cutter body that is connectable to a rotatable spindle or holder and defines a rotation axis, the milling cutter body including a plurality of cutting edges, where at least one first cutting edge of the plurality of cutting edges is terminated in or adjacent to the rotation axis of the milling cutter body, the first cutting edge including a first cutting edge portion having a first radius that is essentially equally great for each point of the first cutting edge portion.

BACKGROUND

In milling, such as contour milling, of material or a workpiece of, for instance, titanium, steel, aluminum, casting or another material, it is since previously known to use so-called center cutting milling tools where one or a plurality of cutting edges reach up to and are terminated in the rotation axis of the milling tool. The milling tool is connectable to a rotatable spindle or holder. Such center cutting milling tools are advantageous in precision contour milling and finishing, in particular at high speeds, such as high feeding and high tooth feed. A known example of center cutting milling tools of the type contour milling tools, such as radius end mill, is the so-called ball nose end mill. The ball nose end mill may have replaceable milling inserts, which may be invertible/indexable, or the ball nose end mill may be of a solid design where the cutting edges are integrated with the milling cutter body. In contour milling, the milling tool rotates in a direction of rotation around its rotation axis at the same time as the workpiece is fed in relation to the milling tool in a feeding direction. In finishing, commonly the milling tool is fed in relation to the workpiece along and against a surface of the workpiece. A ball nose end mill is often used with a feeding direction that forms an essentially perpendicular angle to the rotation axis of the end mill, but other feeding directions are also possible.

U.S. Patent Application Publication No. 2009/0245946 discloses a solid radius end mill of cubic boron nitride. International Publication No. A1-00/29153 discloses a solid ball nose end mill. European Patent Application No. B1-0 985 478 discloses a radius end mill having an indexable milling insert. European Patent Application No. A1-1 252 955 discloses an indexable milling insert intended for a radius end mill. U.S. Pat. No. 5,632,576 and Japanese Application No. 2005-319558 disclose a radius end mill having replaceable milling inserts. U.S. Pat. No. 7,226,249 discloses a replaceable milling insert for a radius end mill. U.S. Pat. No. 6,497,540 discloses a radius end mill.

SUMMARY

It has been found that, in center cutting milling by means of a radius end mill, the radius end mill is often used with only a smaller cutting edge portion, which is closest to the rotation axis of the milling tool, in engagement with the work tool. In milling by means of a radius end mill, it is often required that the radius end mill passes the workpiece comparatively many times in order to generate a satisfactory finished and plane or smooth surface. This is because the radius end mill generates a wave shape or generates furrows/wave troughs that are separated by crests/wave heights. These crests or wave heights are often too high in relation to the wave troughs in order to achieve a satisfactory plane/smooth surface, and accordingly, the radius end mill has to be brought to pass the workpiece several times in order to machine these wave heights and further level the machined surface.

The present disclosure aims at obviating the above-mentioned disadvantages of previously known milling tools and at providing an improved milling tool. Therefore, an object is to provide an improved and more efficient milling of material, such as titanium, steel, aluminum, casting or another material. An additional object is to provide an improved and more efficient center cutting milling of material, such as titanium, steel, aluminum, casting or another material.

In an exemplary embodiment, a milling insert for center cutting milling of material is provided, which milling insert is arranged to be arranged in a seat that is defined by a milling cutter body and situated at a rotation axis defined by the milling cutter body, the milling cutter body being connectable to a rotatable spindle or holder, and the milling insert includes a plurality of cutting edges, where at least one first cutting edge of the plurality of cutting edges is terminated in or adjacent to a center axis that is defined by the milling insert and, when the milling insert is arranged in the seat, intended to coincide with the rotation axis of the milling cutter body, the first cutting edge including a first cutting edge portion having a first radius that is essentially equally great for each point of the first cutting edge portion, and wherein the first cutting edge includes at least one second cutting edge portion that is plane or has at least one second radius for each point of the respective second cutting edge portion, the at least one second radius being greater than the first radius, the at least one second cutting edge portion is situated between the first cutting edge portion and the center axis, one of the at least one second cutting edge portion adjoins the first cutting edge portion, and one of the at least one second cutting edge portion is terminated in or adjacent to the center axis.

By one of the at least one second cutting edge portion being terminated adjacent to the center axis, reference is made to the same being terminated closely to the center axis and at a small distance to the center axis.

In ball nose end mills according to prior art, the respective cutting edge has, at the front part of the end mill, e.g. a cutting edge that reaches up to and is terminated in the rotation axis of the end mill, one and the same radius along the extension of the entire cutting edge. By the milling insert according to the present disclosure being provided with at least one second cutting edge portion closest to the rotation axis the radius of which deviates from the first cutting edge portion of the cutting edge by the second cutting edge portion being plane or having a greater radius in relation to the first cutting edge portion. Thereby, according to the present disclosure, the nose or front of a radius end mill becomes flattened or made flatter in relation to ball nose end mills according to prior art the cutting edge of which has one and the same radius. Compared with prior art, by the present disclosure, wave troughs are generated that are shallower than in prior art, and the wave troughs are separated by wave heights having a reduced height in relation to the wave troughs, which provides a smoother machined surface. Thus, by fewer passes of the milling tool over the workpiece, a machined surface is generated that is more plane and smoother by the present disclosure, whereby a faster finishing of the workpiece and an increased productivity are obtained. An increased service life is also obtained for the milling insert/cutting edge, since thinner chips, i.e., chips having a reduced chip thickness, are removed from the workpiece by means of the disclosed milling insert, by which the load and the wear of the milling insert are reduced. Alternatively, the productivity can be improved by an increase of the tooth feed, e.g., by increasing the speed of the feeding of the workpiece in relation to the milling tool, or increased speed of rotation. An increase of the tooth feed can be done at the expense of the service life of the milling insert, i.e., if the tooth feed is increased, the service life of the milling insert may be decreased, and vice versa. An improved surface quality is achieved of the surface of the workpiece generated by the cutting edges. Thus, by the disclosed milling insert, an improved and more efficient milling of material, such as titanium, steel, aluminum, casting or another material, is provided, and in particular an improved and more efficient center cutting milling of material, such as titanium, steel, aluminum, casting or another material.

According to the above, it is stated that the first cutting edge portion has a first radius that is essentially equally great for each point of the first cutting edge portion. By this, it is meant that the first radius is in principle equally great for points on the first cutting edge portion but with allowance made for possible manufacturing tolerances/inaccuracies that may result in insignificant and acceptable deviations of the radius for the points on the first cutting edge portion. If the intended radius for each point of the first cutting edge portion should be 10 mm, the allowed interval of the radius may be 9.95 to 10.05 mm considering manufacturing tolerances. The at least one second radius is outside such an interval of the manufacturing tolerances.

The at least one second cutting edge portion may be in the form of a second cutting edge portion that is plane or has the at least one second radius. The at least one second cutting edge portion may also include two or more second cutting edge portions, one or a plurality of which are plane and/or one or a plurality have the at least one second radius. All of the at least one second cutting edge portion may have the at least one second radius. A plurality of second cutting edge portions of a cutting edge may, in relation to each other, have different second radii, wherein a cutting edge accordingly may include a plurality of different second radii. If the at least one second cutting edge portion includes two or a plurality of second cutting edge portions and includes a plane second cutting edge portion, the plane second cutting edge portion may advantageously be the second cutting edge portion that is terminated in or adjacent to the center axis and/or the rotation axis. The at least one second cutting edge portion may form/define a part of a circle, the second radius of which according to the present disclosure is greater than the first radius, or may define a part of an ellipse.

As is defined above, the center axis of the milling insert is intended and arranged to coincide with the rotation axis of the milling cutter body when the milling insert is arranged in the seat of the milling cutter body. When the milling insert is arranged in the seat of the milling cutter body, the center axis of the milling insert accordingly forms a common line with the rotation axis of the milling cutter body.

By a plurality of cutting edges, two or more cutting edges are intended. The fact that the cutting edge portion has a radius means that the cutting edge in this portion has an essentially arched shape so that the cutting edge portion in center cutting machining can generate a partial spherical surface. The radius that a cutting edge has in this connection, e.g., the first or second radius that the respective cutting edge portion has, is defined as the distance from a point of the cutting edge to an axis around which the cutting edge curves. Each point of the cutting edge, except in the proper rotation axis, has also a radial distance to the rotation axis of the cutting tool, the radial distance to the rotation axis being lying in a radial plane that is perpendicular to the rotation axis. This radial distance to the rotation axis does not correspond to the radius of the cutting edge or a cutting edge portion as is defined in the accompanying claims, but may also be used to define the cutting tool and the cutting edges thereof.

By the at least one second cutting edge portion having at least one second radius that is "greater" than the first radius, here is meant that the at least one second radius is so much greater than the first radius that the difference between the first and second radius has a qualitative, or significant, effect on the milling operation and on the machined surface of the workpiece.

The presently disclosed inserts are advantageous in precision contour milling and for the finishing of surfaces, for, e.g., depths of approx. 0.2 mm, but also other depths are possible and are advantageous for the machining of relatively flat surfaces of workpieces. The milling insert may be indexable.

The above mentioned tooth feed is a term or quantity that indicates the feeding per tooth/cutting edge/milling insert. For instance, if a workpiece is fed 1 mm in relation to the milling tool while the milling tool rotates one complete revolution, i.e. 360°, and the milling tool has ten cutting edges in the same radial plane, the tooth feed will be 0.10 mm/tooth. A common tooth feed is 0.15 mm/tooth. The tooth feed can also be defined according to the following formula, wherein $f_z$ is the tooth feed, $v_f$ is the feed speed, n is the rotational speed and z is the number of milling inserts in the milling cutter:

$$f_z = \frac{v_f}{n \times z}$$

According to an advantageous embodiment of the disclosed milling insert, the milling insert is arranged to be replaceably arranged in the seat defined by the milling cutter body.

According to another advantageous embodiment of the disclosed milling insert, a second cutting edge of the plurality of cutting edges is terminated in or adjacent to the center axis defined by the milling insert, wherein the second cutting edge includes a first cutting edge portion having a first radius that is essentially equally great for each point of the first cutting edge portion, the second cutting edge includes at least one second cutting edge portion that is plane or has at least one second radius for each point of the respective second cutting edge portion of the second cutting edge, the at least one second radius of the second cutting edge portion of the second cutting edge being greater than the first radius of the first cutting edge portion of the second cutting edge, the at least one second cutting edge portion of the second cutting edge is situated between the first cutting edge portion of the second cutting edge and the center axis, one of the at least one second cutting edge portion of the second cutting edge adjoins the first cutting edge portion, and one of the at least one second cutting edge portion of the second cutting edge is terminated in or adjacent to the center axis. By having two cutting edges that reach up to and are terminated at the center axis and that have the at least one second cutting edge portion, the effects described above are further enhanced.

According to an additional advantageous embodiment of the disclosed milling insert, the at least one second cutting edge portion has the at least one second radius. Thus, by this embodiment, the at least one second cutting edge portion is not plane but has a curvature as is defined according to the above. By giving the at least one second cutting edge portion a curvature instead of being plane, milling of material is further improved and rendered more effective by the fact that a good milling and finishing of the workpiece is obtained, such as a smooth and plane generated surface, even if the angle between the feeding direction of the milling tool, in relation to the workpiece, and its rotation axis deviates from 90°. The milling tool is maybe mounted in the spindle so that its rotation axis does not get the correct alignment and other parameters may contribute to the angle not becoming 90°. There will also be a naturally smooth transition between the at least one second cutting edge portion and the first edge portion, which provides a smaller load on and wear of the milling insert and accordingly a longer service life of the milling insert.

According to another embodiment of the disclosed milling insert, the second cutting edge portion, which is terminated in or adjacent to the center axis, forms an essentially right angle with the center axis. By this embodiment, wave troughs are obtained in the workpiece that are even more plane and shallow, whereby a further improved and more efficient milling is achieved.

According to still another advantageous embodiment of the disclosed milling insert, the first cutting edge portion curves around a first axis, where the first radius is the distance from any point of the first cutting edge portion to the first axis, the at least one second cutting edge portion curves around at least one second axis, where the at least one second radius is the distance from any point of the respective second cutting edge portion to the respective second axis, and the first axis and the at least one second axis intersect the center axis. By this embodiment, it is efficiently guaranteed that the second cutting edge portion, which is terminated in or adjacent to the center axis, forms an essentially right angle with the center axis, whereby wave troughs are obtained in the workpiece that are even more plane and shallow, whereby a further improved and more efficient milling is achieved.

According to yet another embodiment of the disclosed milling insert, the length of the at least one second cutting edge portion along the extension of the respective cutting edge is at least $1/100$ of the first radius. The inventors have found that a cutting edge having dimensions according to this embodiment further improves and renders more effective the milling of the workpiece.

According to still another advantageous embodiment of the disclosed milling insert, the length of the at least one second cutting edge portion along the extension of the respective cutting edge is less than $1/5$ of the first radius. The inventors have found that a cutting edge having dimensions according to this embodiment further improves and renders more effective the milling of the workpiece.

According to an advantageous embodiment of the disclosed milling insert, the length of the at least one second cutting edge portion along the extension of the respective cutting edge is less than $1/10$ of the first radius. The inventors have found that a cutting edge having dimensions according to this embodiment even more improves and renders more effective the milling of the workpiece.

According to an additional advantageous embodiment of the disclosed milling insert, the at least one second radius is 10% greater than the first radius. The inventors have found that the milling becomes further effective and improved by a cutting edge having dimensions or a geometry according to this embodiment.

According to another advantageous embodiment of the disclosed milling insert, the at least one second radius is 30% greater than the first radius. The inventors have found that a cutting edge having dimensions and a geometry according to this embodiment even more improves and renders more effective the milling of the workpiece.

According to yet another advantageous embodiment of the disclosed milling insert, the at least one second radius is less than 1000 times the first radius. The inventors have found that, by this embodiment, wave troughs are obtained in the workpiece that are even more plane and shallow, whereby a further improved and more efficient milling is achieved. Consequently, plane and shallower wave troughs in the workpiece provide wave heights in the workpiece that are lower in relation to the wave troughs. More plane wave troughs and lower wave heights in the workpiece provide a smoother surface of the workpiece.

According to still another advantageous embodiment of the disclosed milling insert, the at least one second radius is less than ten times the first radius. The inventors have found that, by this embodiment, wave troughs are obtained in the workpiece that are even more plane and shallow, whereby a further improved and more efficient milling is achieved.

According to an advantageous embodiment of the disclosed milling insert, the at least one second radius is less than four times the first radius. The inventors have found that, by this embodiment, wave troughs are obtained in the workpiece that are even more plane and shallow, whereby a further improved and more efficient milling is achieved.

According to an additional advantageous embodiment of the disclosed milling insert, the cutting edge has a tangent in each point of the cutting edge in a transition between the first cutting edge portion and the adjacent second cutting edge portion. By this smooth transition between the first cutting edge portion and the adjacent second cutting edge portion, the load on the cutting edge and the milling insert decreases and the service life of the milling insert is extended, in particular in milling operations where the angle between the feeding direction of the milling tool, in relation to the workpiece, and its rotation axis deviates from 90°.

According to another advantageous embodiment of the disclosed milling insert, in each point of the at least one second cutting edge portion, the at least one second cutting edge portion has a tangent that forms a right angle with the center axis or intersects the center axis outside a surface of revolution that is defined by the first cutting edge in its rotation around the center axis. By this embodiment, there are not present any indentations in the at least one second cutting edge portion or concave portions along the at least one second cutting edge portion, whereby wave troughs are obtained in the workpiece that are even more plane and shallow and an even more improved and more efficient milling is achieved.

According to yet another advantageous embodiment of the disclosed milling insert, in each point of the first cutting edge portion, the first cutting edge portion has a tangent that forms a right angle with the center axis or intersects the center axis outside a surface of revolution that is defined by the first cutting edge in its rotation around the center axis. By this embodiment, there are not present any indentations in the first cutting edge portion or concave portions along the first cutting edge portion, whereby wave troughs are obtained that are even more plane and shallow and an even more improved and more efficient milling is achieved.

According to still another advantageous embodiment of the disclosed milling insert, the milling insert is in the form of a radius end milling insert. In this way, an efficient and improved radius end milling insert is obtained for those reasons that are stated in connection with the above-mentioned embodiments of the milling insert.

According to an advantageous embodiment of the disclosed milling insert, the milling insert is in the form of a ball nose end milling insert. In this way, an efficient and improved ball nose end milling insert is obtained for those reasons that are stated in connection with the above-mentioned embodiments of the milling insert.

The above mentioned objects of the present disclosure are achieved also by providing a tool for center cutting milling of material, including a milling cutter body that is connectable to a rotatable spindle or holder and defines a rotation axis, where the milling cutter body includes a seat situated at the rotation axis and intended for a milling insert, the tool in addition being provided with a milling insert arranged in the seat, and the milling insert including the features of any one of the embodiments of the disclosed milling insert. Positive technical effects of the disclosed tool and the embodiments thereof correspond to the above described technical effects mentioned in connection with the disclosed milling insert and the embodiments thereof.

The above mentioned objects are also achieved by providing a device for center cutting milling of material, including a milling cutter body that is connectable to a rotatable spindle or holder and defines a rotation axis, the milling cutter body including a plurality of cutting edges, where at least one first cutting edge of the plurality of cutting edges is terminated in or adjacent to the rotation axis of the milling cutter body, the first cutting edge including a first cutting edge portion having a first radius that is essentially equally great for each point of the first cutting edge portion, and wherein the first cutting edge includes at least one second cutting edge portion that is plane or has at least one second radius for each point of the respective second cutting edge portion, the at least one second radius being greater than the first radius, the at least one second cutting edge portion is situated between the first cutting edge portion and the rotation axis, one of the at least one second cutting edge portion adjoins the first cutting edge portion, and one of the at least one second cutting edge portion is terminated in or adjacent to the rotation axis. The positive effects of the disclosed device correspond to those effects that are stated in connection with the above description of the disclosed milling insert.

The milling cutter body of the disclosed device may also be supplemented and provided with conventional peripheral cutting edges that extend around and along the rotation axis outside the front portion of the milling cutter body. These so-called peripheral cutting edges may be formed in ways known to a person skilled in the art.

According to an advantageous embodiment of the disclosed device, a second cutting edge of the plurality of cutting edges is terminated in or adjacent to the rotation axis of the milling cutter body, wherein the second cutting edge includes a first cutting edge portion having a first radius that is essentially equally great for each point of the first cutting edge portion, the second cutting edge includes at least one second cutting edge portion that is plane or has at least one second radius for each point of the respective second cutting edge portion of the second cutting edge, the at least one second radius of the second cutting edge portion of the second cutting edge being greater than the first radius of the first cutting edge portion of the second cutting edge, the at least one second cutting edge portion of the second cutting edge is situated between the first cutting edge portion of the second cutting edge and the rotation axis, one of the at least one second cutting edge portion of the second cutting edge adjoins the first cutting edge portion, and one of the at least one second cutting edge portion of the second cutting edge is terminated in or adjacent to the rotation axis.

According to another advantageous embodiment of the disclosed device, the milling cutter body has at least four cutting edges.

According to an additional advantageous embodiment of the disclosed device, the at least one second cutting edge portion has the at least one second radius.

According to another advantageous embodiment of the disclosed device, the second cutting edge portion, which is terminated in or adjacent to the rotation axis, forms an essentially right angle with the rotation axis.

According to still another advantageous embodiment of the disclosed device, the first cutting edge portion curves around a first axis, where the first radius is the distance from any point of the first cutting edge portion to the first axis, the at least one second cutting edge portion curves around at least one second axis, where the at least one second radius is the distance from any point of the respective second cutting edge portion to the respective second axis, and the first axis and the at least one second axis intersect the rotation axis.

According to yet another advantageous embodiment of the disclosed device, the length of the at least one second cutting edge portion along the extension of the respective cutting edge is at least $1/100$ of the first radius.

According to still another advantageous embodiment of the disclosed device, the length of the at least one second cutting edge portion along the extension of the respective cutting edge is less than $1/5$ of the first radius.

According to an advantageous embodiment of the disclosed device, the length of the at least one second cutting edge portion along the extension of the respective cutting edge is less than $1/10$ of the first radius.

According to an additional advantageous embodiment of the disclosed device, the at least one second radius is 10% greater than the first radius.

According to another advantageous embodiment of the disclosed device, the at least one second radius is 30% greater than the first radius.

According to yet another advantageous embodiment of the disclosed device, the at least one second radius is less than 1000 times the first radius.

According to still another advantageous embodiment of the disclosed device, the at least one second radius is less than ten times the first radius.

According to an advantageous embodiment of the disclosed device, the at least one second radius is less than four times the first radius.

According to an additional advantageous embodiment of the disclosed device, the cutting edge has a tangent in each point of the cutting edge in a transition between the first cutting edge portion and the adjacent second cutting edge portion.

According to another advantageous embodiment of the disclosed device, in each point of the at least one second cutting edge portion, the at least one second cutting edge portion has a tangent that forms a right angle with the rotation axis or intersects the rotation axis outside a surface of revolution that is defined by the first cutting edge in its rotation around the rotation axis.

According to yet another advantageous embodiment of the disclosed device, in each point of the first cutting edge portion, the first cutting edge portion has a tangent that forms a right angle with the rotation axis or intersects the rotation axis outside a surface of revolution that is defined by the first cutting edge in its rotation around the rotation axis.

According to an advantageous embodiment of the disclosed tool or the disclosed device, the tool or the device is in the form of a radius end mill tool.

According to an advantageous embodiment of the disclosed tool or the disclosed device, the tool or the device is in the form of a ball nose end mill tool.

Positive technical effects of embodiments described above of the disclosed device correspond to those effects that are stated in connection with the above description of the corresponding embodiments of the disclosed milling insert.

According to an advantageous embodiment of the disclosed milling insert and the disclosed device, respectively, in each point of the respective cutting edge, which is terminated in or adjacent to the center/rotation axis, the cutting edge has a tangent that forms a right angle with the center/rotation axis or intersects the center axis outside a surface of revolution that is defined by the first cutting edge in its rotation around the center/rotation axis. By this embodiment, there are not present any indentations in the respective cutting edge, which is terminated in or adjacent to the center/rotation axis, or concave portions along the cutting edge, whereby wave troughs are obtained that are even more plane and shallow and an even more improved and more efficient milling is achieved.

According to another advantageous embodiment of the disclosed milling insert and the disclosed device, respectively, the first cutting edge and/or the second cutting edge are/is terminated in the center/rotation axis. According to still another advantageous embodiment of the disclosed milling insert and the disclosed device, respectively, one of the at least one second cutting edge portion is terminated in the center/rotation axis.

The embodiments described above of the disclosed milling insert, the disclosed tool and the disclosed device, respectively, may be combined in different possible ways to achieve further advantageous embodiments of the disclosed milling insert, the disclosed tool and the disclosed device, respectively.

The milling cutter body, or the tool body, may advantageously be manufactured from a material that is softer than the material of the milling insert or cutting edge. The milling insert/cutting edge may, e.g., be manufactured from a cemented carbide, e.g. with a coating, such as ceramics, while the milling cutter body may be manufactured from steel.

Further advantageous embodiments of the milling insert, the tool and the device, respectively, according to the present disclosure and further advantages are seen in the detailed description of embodiments.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated herein and constitute part of this specification, illustrate the presently preferred embodiments of the disclosure, and together with the general description given above and the detailed description given below, serve to explain features of the disclosure.

FIG. 3A shows a schematic planar view of the milling insert in FIGS. 1-2 as seen from above;

FIG. 3B is a schematic enlargement of a portion of the milling insert in FIG. 3A;

FIG. 4 shows a schematic detailed view of a second embodiment of the milling insert;

DETAILED DESCRIPTION OF THE PREFERRED EMBODIMENTS

Figure 1:
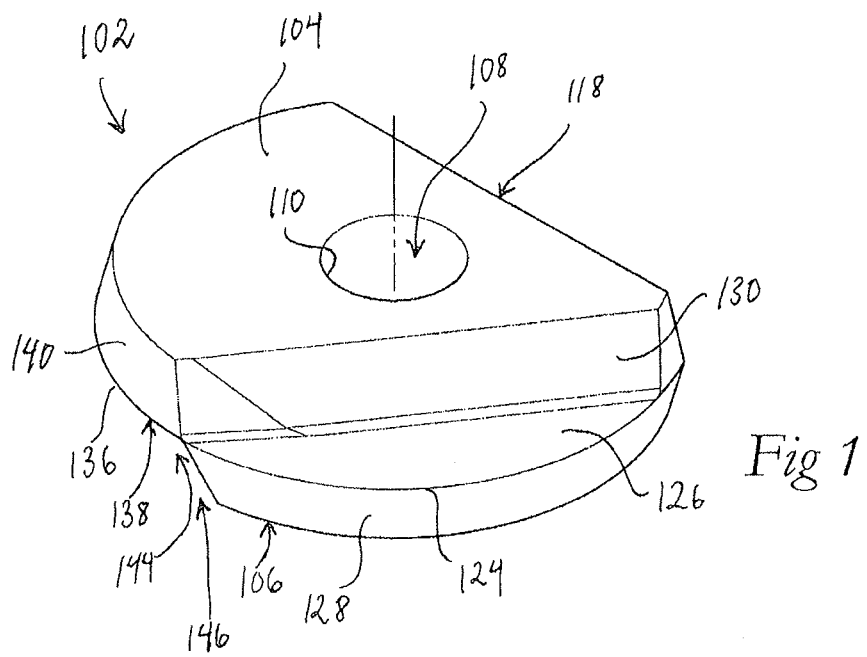
FIG. 1 shows a schematic perspective view of a first embodiment of the milling insert.
Figure 2:
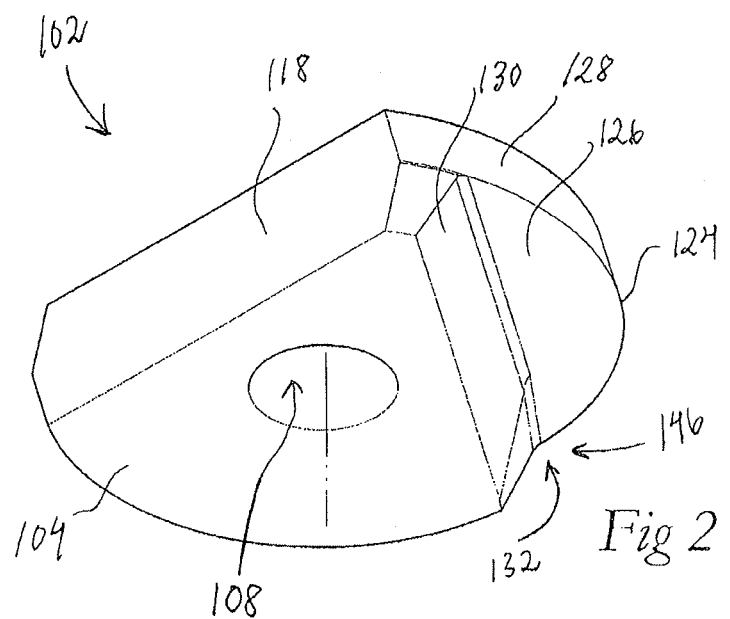
FIG. 2 shows another schematic perspective view of the milling insert in FIG. 1.

With reference to FIGS. 1-2, FIGS. 3A-B and FIGS. 5-6, there is schematically shown a first embodiment of the milling insert 102 for center cutting milling of material. Here, the milling insert 102 is in the form of a ball nose end milling insert and may entirely or partly be manufactured from a cemented carbide or ceramics. The milling insert 102 includes an upper side 104 and an under side 106, between which sides 104, 106 a through mounting hole 108 passes through the milling insert 102, and accordingly the milling insert 102 defines the mounting hole 108. The mounting hole 108 is limited by an inner wall 110. In this embodiment, the cross-section of the mounting hole 108 is circular, but other shapes of the mounting hole are possible. The milling insert 102 is arranged to be replaceably or detachably arranged in a seat 114 defined by a milling cutter body 112 (see FIG. 7A) by means of mounting members 116, which include the mounting hole 108. The milling insert 102 has a back side 118 arranged to abut against the interior part of the seat 114 of the milling cutter body 112 when the milling insert is mounted to the milling cutter body 112. With reference to FIG. 3A, the milling insert 102 defines a center axis 120, which, when the milling insert 102 is arranged in the seat 114 of the milling cutter body 112, is intended and arranged to coincide with the rotation axis 122 of the milling cutter body 112 (see FIGS. 7A-B).

The milling insert 102 has a first cutting edge 124 that is adjoined by a first chip surface 126 and a first clearance surface 128. The first clearance surface 128 extends between the under side 106 of the milling insert and the first chip surface 126, and the first clearance surface 128 forms an acute angle with the first chip surface 126 and an obtuse angle with the under side 106. Between the first chip surface 126 and the upper side 104 of the milling insert 102, a first intermediate surface 130 extends, which, together with the first chip surface 126, defines a chip flute 132, or chute, that serves as a chip channel for chips removed from the workpiece 134, which constitutes the material that is machined. The workpiece 134 may include, for instance, titanium, steel, aluminum, casting or another material.

The milling insert 102 has also a second cutting edge 136 that is adjoined by a second chip surface 138 (see FIG. 5) and a second clearance surface 140, which extends between the upper side 104 of the milling insert and the second chip surface 138. The second clearance surface 140 forms an acute angle with the second chip surface 138 and an obtuse angle with the upper side 104. Between the second chip surface 138 and the under side 106 of the milling insert 102, a second intermediate surface 142 extends, which, together with the second chip surface 138, defines a chip flute 144. The milling insert 102 according to this embodiment is not indexable, but according to other aspects of the milling insert, it is possible to form the milling insert 102 so that it is indexable. How the milling insert in FIGS. 1-2 should be redesigned to become indexable is easily realized by a person skilled in the art.

The milling insert 102 has a front portion 146 through which the center axis 120 of the milling insert 102 intersects. In the front portion 146, the first and second cutting edge 124, 136 reach up to and are terminated in the center axis 120 defined by the milling insert 102, the two cutting edges 124, 136 meeting in the center axis 120 and in the front portion 146 (see FIGS. 5 and 6).

With reference to FIG. 3A and FIG. 3B, the first embodiment of the milling insert 102 is described with reference to the first cutting edge 124. However, in this embodiment, the second cutting edge 136 is formed in a corresponding way and the below description is applicable also to the second cutting edge 136. The respective cutting edge 124 includes a first cutting edge portion 148 having a first radius $R_1$, which is essentially equally great for each point of the first cutting edge portion 148. The first radius $R_1$ is the distance from any point of the first cutting edge portion 148 to a first axis 150 around which the first cutting edge portion 148 curves. The respective cutting edge 124 includes a second cutting edge portion 152 (in FIGS. 3B and 4, the corresponding second cutting edge portion of the second cutting edge 136 is indicated by the reference designation 153). In other embodiments of the disclosed milling insert, the cutting edge may include two or more second cutting edge portions. The second cutting edge portion 152 has at least one second radius $R_2$ for each point of the second cutting edge portion 152, the at least one second radius $R_2$ being greater than the first radius $R_1$. The second radius $R_2$ is the distance from any point of the second cutting edge portion 152 to a second axis 154 around which the second cutting edge portion 152 curves. The first axis 150 and the second axis 154 may both intersect the center axis 120. The second cutting edge portion 152 is situated between the first cutting edge portion 148 and the center axis 120 of the milling insert 102 and adjoins the first cutting edge portion 148. The second cutting edge portion 152 is terminated in the center axis 120 and forms an essentially right angle with the center axis 120. In this embodiment, the first cutting edge portion 148 extends from the second cutting edge portion 152 to its meeting/intersection 156 with the intermediate surface 130.

If the cutting edge 124 according to another embodiment includes three second cutting edge portions, one second cutting edge portion would adjoin the first cutting edge portion, another one of the second cutting edge portions would be connected in the center axis, while the third one of the second cutting edge portions would be situated between the other two second cutting edge portions. It will be in the corresponding way if the cutting edge includes more than three second cutting edge portions.

In each point of the cutting edge 124 in a transition 158 between the first cutting edge portion 148 and the adjacent second cutting edge portion 152, the cutting edge 124 may have a tangent, which provides a smooth transition without any sharp corner between the first and second cutting edge portion 148, 152 and a reduced wear of the milling insert 102.

In each point of the at least one second cutting edge portion 152 and the first cutting edge portion 148, the respective cutting edge portion 148, 152 may have a tangent that forms a right angle with the center axis 120 or intersects the center axis 120 outside a surface of revolution that is defined by the first cutting edge 124 in its rotation around the center axis 120, whereby no indentations or concave portions are present in the cutting edge portions 148, 152 along the extension of the respective edge portion 148, 152.

The first radius $R_1$ may, e.g., be 5-32 mm. However, other dimensions are possible. The length of the at least one second cutting edge portion 152 along the extension of the respective cutting edge 124 may be at least 1/100 of the first radius $R_1$ and less than 1/5 of the first radius $R_1$. The length of the at least one second cutting edge portion 152 along the extension of the respective cutting edge 124 may even be less than 1/10 of the first radius $R_1$. In the shown first embodiment of the milling insert 102 according to the present disclosure, the second radius $R_2$ is approximately two times greater than the first radius $R_1$. If $R_1$ is approx. 10 mm, $R_2$ is accordingly approx. 20 mm. However, other dimensions and relationships are possible. Advantageously, the at least one second radius $R_2$ is 30% greater than the first radius $R_1$. Advantageously, the at least one second radius $R_2$ is less than four times the first radius $R_1$.

With reference to FIG. 4, a second embodiment of the milling insert 202 is shown. This embodiment essentially corresponds to the shown first embodiment of the milling insert 102, but has another cutting edge 224 having a differently designed second cutting edge portion 252. Instead of having a radius and being curved around an axis, as is the case with the first milling insert 102, the second cutting edge portion 252 of the milling insert 202 is plane. This second cutting edge portion 252 is also terminated in the center axis 220 of the milling insert 202 and forms an essentially right angle with the center axis. In each point of the cutting edge 224 in a transition 258 between the first cutting edge portion 248 and the adjacent second cutting edge portion 252, the cutting edge 224 has a tangent, which provides a smooth transition without any sharp corner between the first and second cutting edge portion 248, 252.

Figure 5:
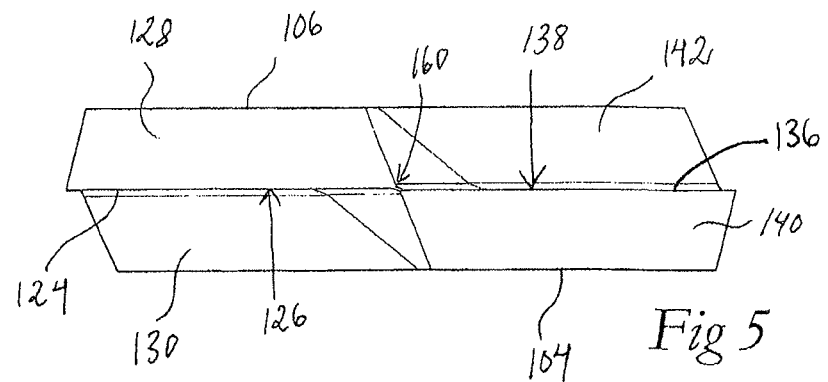
FIG. 5 is a schematic front view of the milling insert in FIGS. 1-2 as seen toward the front of the milling insert.
Figure 6:
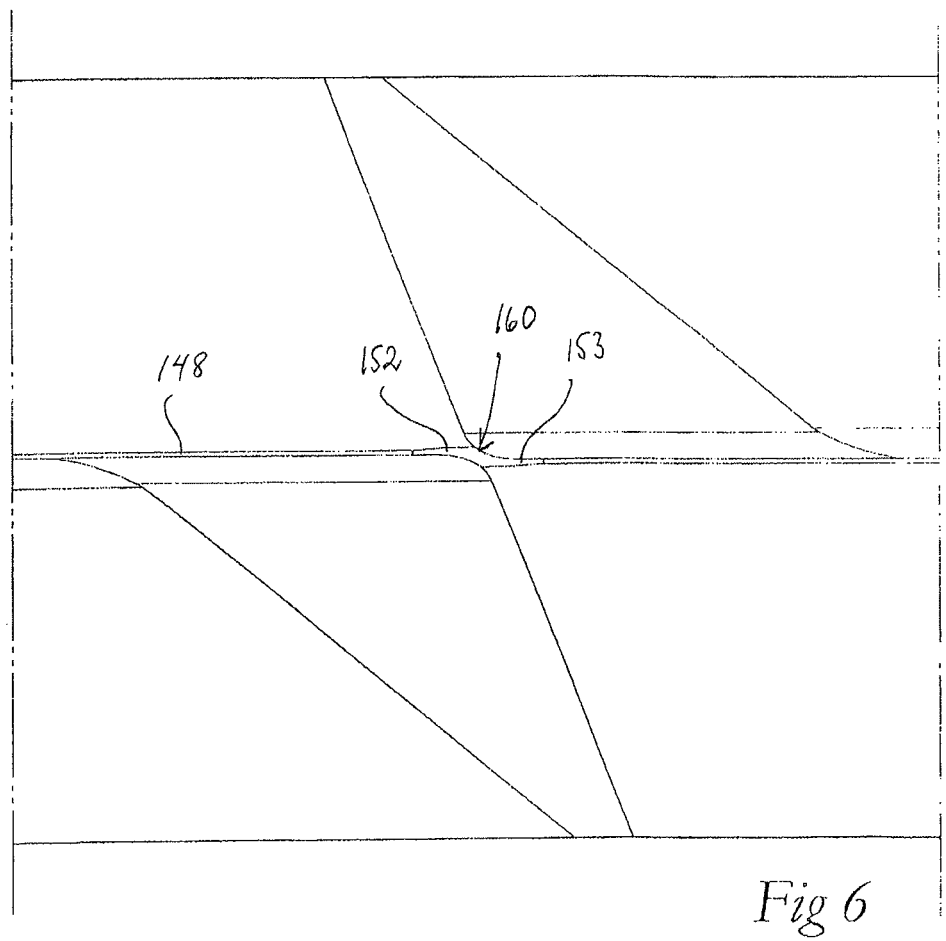
FIG. 6 schematically shows an enlargement of a part of FIG. 5.

With reference to FIGS. 5 and 6, it is shown how the first cutting edge 124 and the second cutting edge 136 meet in the center axis 120. The two cutting edges 124, 136 are in principle lying in one and the same plane. The design of the front cutting edge portion 160, where the two cutting edges 124, 136 meet, may have different designs, and the front cutting edge portion 160 may, e.g., have a more salient S-shape as seen toward the front portion 146 of the milling insert 102 in the direction of the center axis 120.

Figure 7A:
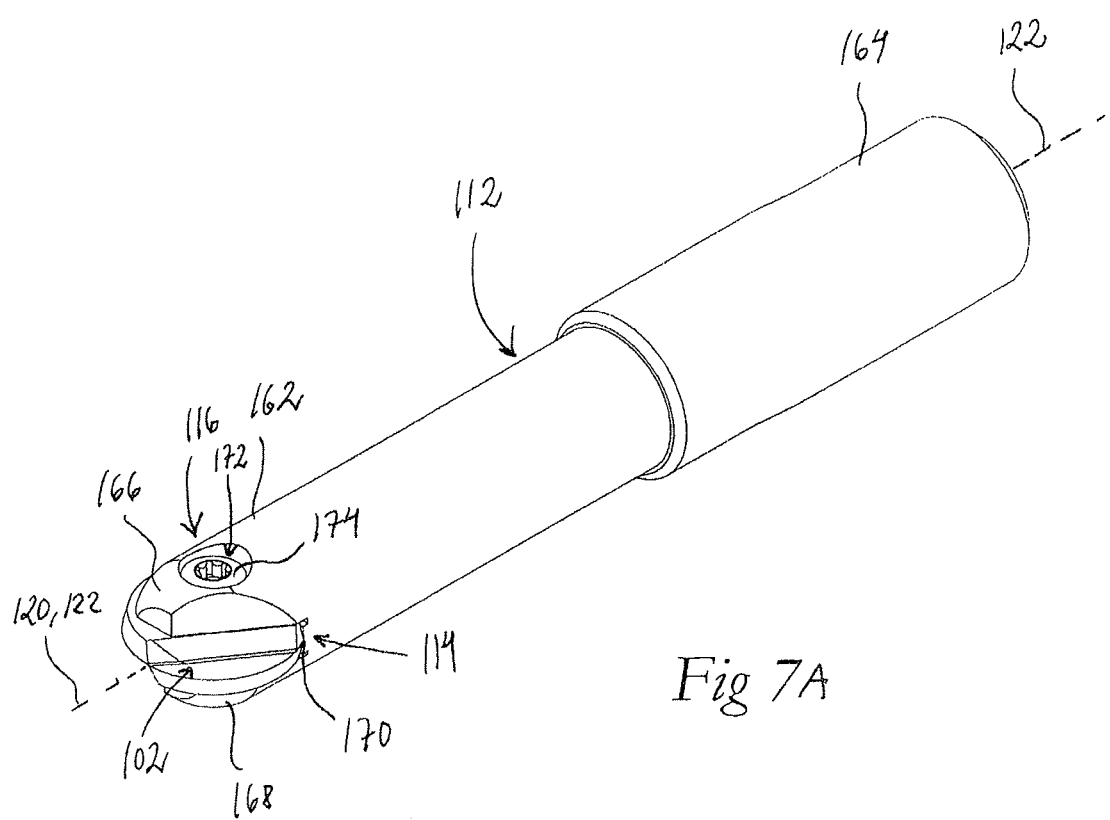
FIG. 7A shows a schematic perspective view of a tool provided with the milling insert shown in FIGS. 1-2.
Figure 7B:
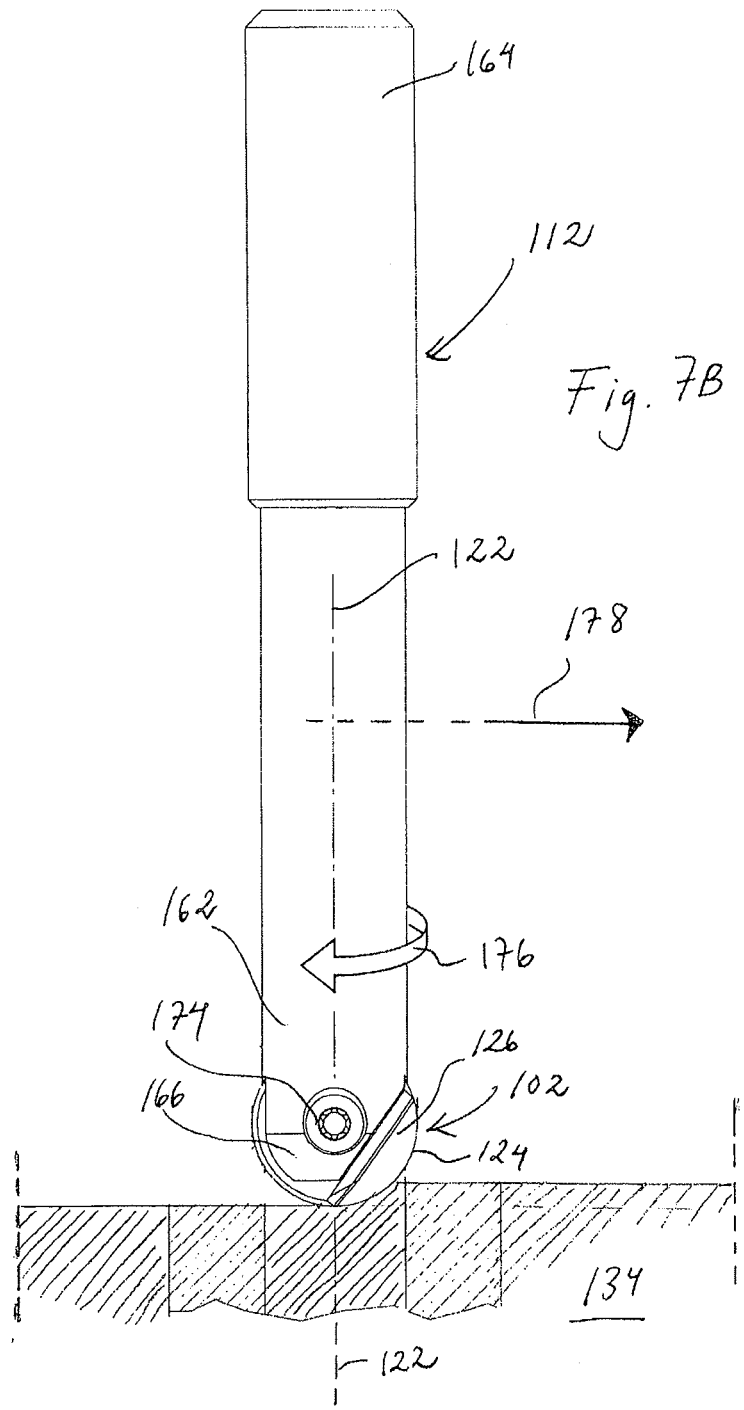
FIG. 7B is a schematic side view of the tool in FIG. 7A while machining a workpiece.
Figure 8:
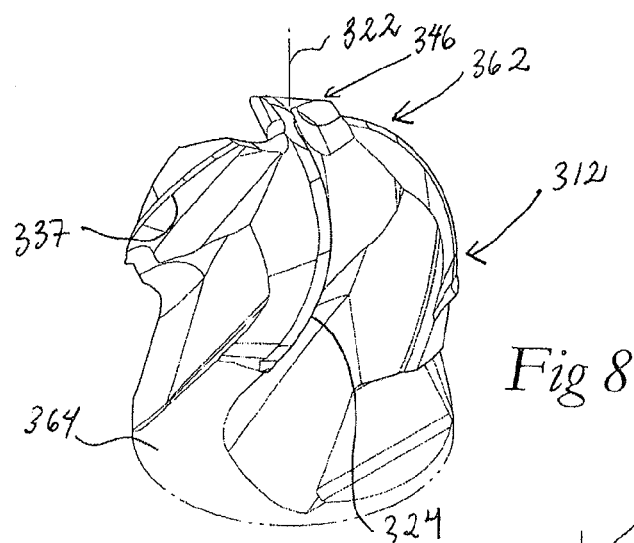
FIG. 8 shows a schematic partial perspective view of an embodiment of the device.
Figure 9:
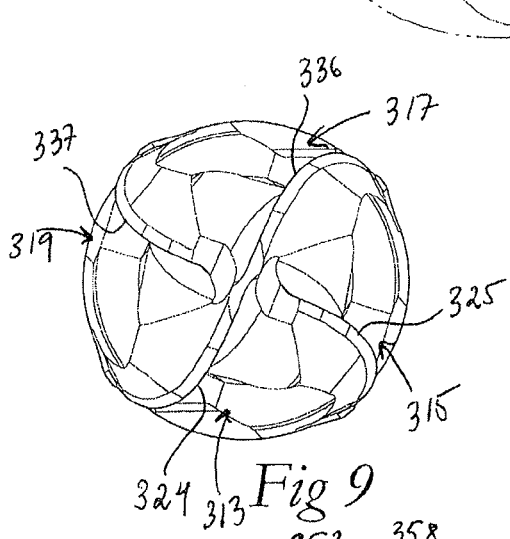
FIG. 9 shows a schematic front view of the device in FIG. 8 as seen toward the front of the device.
Figure 10:
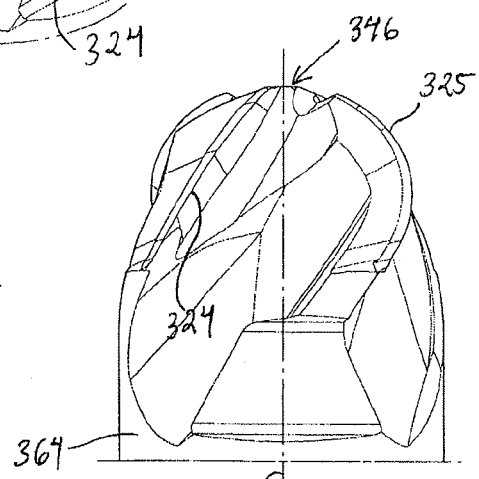
FIG. 10 shows a schematic side view of the device in FIG. 8.
Figure 11:
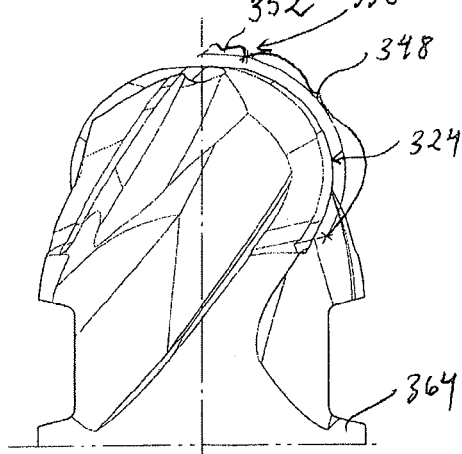
FIG. 11 shows a schematic side view of the device in FIG. 10 rotated approx. 90° around its rotation axis in relation to FIG. 10.
Figure 12:
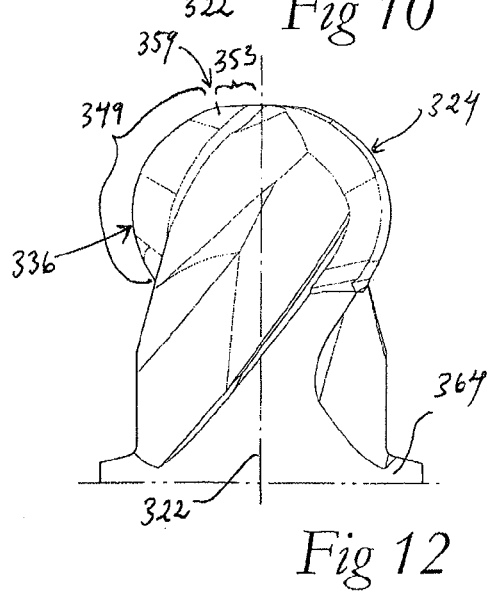
FIG. 12 shows a schematic side view of the device in FIG. 11 but with details removed for illustrative purposes.

With reference to FIGS. 7A and 7B, a milling tool is schematically shown for center cutting milling of material, in the form of a ball nose end mill tool for chip removing machining of metal. The milling tool has a mounted milling insert 102, 202 as described according to the above in connection with FIGS. 1-6. The milling tool includes a milling cutter body 112 that defines a rotation axis 122. The milling cutter body 112 has a front main part 162 provided with a seat 114 to receive and hold the milling insert 102, and the milling cutter body 112 has a rear part 164 for the connection to, by the attachment into, a rotatable spindle or tool holder (not shown) in a way known to a person skilled in the art. The front main part 162 of the milling cutter body 112 includes two legs 166, 168 separated from each other, and the seat 114 is in the form of a pocket 114 that is defined by the two legs 166, 168 of the milling cutter body 112. In the mounted state, the back side 118 of the milling insert 102 is arranged to abut against a bottom surface 170 between the two legs 166, 168. The respective leg 166, 168 is provided with a through hole 172 that coincides with the mounting hole 108 of the milling insert when the milling insert is received in the seat 114. The mounting members 116 of the tool for mounting the milling insert 102 include a mounting element 174, here in the form of a screw, arranged to engage with the hole 172 of the legs 166, 168 and the mounting hole 108 of the milling insert 102 in order to thereby lock the milling insert 102 in the seat 114. As is seen in FIG. 7A, the seat 114 is situated at the rotation axis 122 defined by the milling cutter body 112. The mounting element 174 may be provided with at least one external thread and the holes of the legs 166, 168 may each be provided with at least one internal thread. According to other aspects of the disclosed tool, one leg may be provided with a through hole while the second leg lacks such a hole, or the second leg has only a recess that may be provided with at least one internal thread that opens toward the second leg and that may receive a mounting element, such as a screw. However, additional alternative mounting members to arrange the milling insert at the milling cutter body are possible, e.g. the hole for one of the legs may lack internal thread so that the hole of only one leg is threaded. Neither does the mounting element 174 have to be threaded, but may be locked in other ways known to a person skilled in the art. Mounting members may instead include a clamp for the fixation of the milling insert 102 in the seat 114, etc.

With reference to FIG. 7B, the milling cutter body 112 rotates in a direction of rotation 176 around its rotation axis 122 at the same time as the workpiece 134 is fed in relation to the milling cutter body 112 of the milling tool in a feeding direction 178 in contour milling. In finishing, the milling tool is commonly fed in relation to the workpiece 134 along a surface of the workpiece 134. A ball nose end mill tool is often used with a feeding direction 178 that forms an essentially perpendicular angle with the rotation axis 122 of the milling tool, but other feeding directions are also possible. As is seen in FIG. 7B, the milling insert 102 is mounted to the rotary milling cutter body 112 so that the chip surface 126 of a cutting edge 124 is heading the clearance surface 128 of the cutting edge 124 in the direction of rotation 176.

In the embodiments described above, the milling cutter body is advantageously manufactured from a material that is softer than the material of the milling inserts. The milling inserts may, e.g., be manufactured from a cemented carbide while the milling cutter body is manufactured from steel.

With reference to FIGS. 8-12, a device is schematically shown for center cutting milling of material in the form of a ball nose end mill tool for chip removing machining of metal, which, in contrast to the tool in FIGS. 7A-7B, is not provided with replaceable milling inserts but has cutting edges that are integrated with the milling cutter body. The device includes a milling cutter body 312 having a front main part 362 and a rear part 364. The rear part 364 may, in a way known to a person skilled in the art, be provided with mounting members, such as a threaded part, in order to arrange the milling cutter body 312 at a coupling element (not shown) that in turn is arranged for the attachment into a rotatable tool holder or arranged for the attachment into another intermediate unit, which in turn is arranged for the attachment into a rotatable tool holder/spindle. Alternatively, the milling cutter body 312 may be integrated with such a coupling element. The envelope surface of the coupling element may have an essentially cylindrical basic shape. In the example shown, the front main part 362 defines a surface of revolution that has an essentially spherical basic shape. The milling cutter body 312 defines a rotation axis 322 as well as longitudinal center axis for the milling cutter body 312. The milling cutter body 312 is provided with four peripheral cutting edges 324, 325, 336, 337, which are integrated with the milling cutter body 312 and each of which extends along a helical shape. A first cutting edge 324 and a second cutting edge 336 of the four cutting edges reach up to and are terminated in the rotation axis 322 of the milling cutter body 312, while the two other cutting edges 325, 337 are terminated before the rotation axis 322. The milling cutter body 312 includes four chutes 313, 315, 317, 319, each of which extends along a helical shape from the front portion 346 of the milling cutter body 312 toward the rear part 364. The chutes 313, 315, 317, 319 serve as a chip channel for chips removed from the workpiece. The respective cutting edge 324, 325, 336, 337 is arranged between two chutes 313, 315, 317, 319 and also extends from the front portion 346 of the milling cutter body 312 toward the rear part 364.

In the embodiments where the milling cutter body 312 is integrated with a coupling element that is arranged to be connected to a spindle or another intermediate unit, the cutting edges 324, 325, 336, 337 may continue their extension in a way known to a person skilled in the art and may extend along the axial extension of the coupling element and, e.g., along a helical shape around the periphery of the coupling element, wherein the envelope surface of the coupling element may have a cylindrical basic shape.

Correspondingly as for the cutting edges 124, 136 in FIGS. 1-6, the first cutting edge 324 includes a first cutting edge portion 348 having a first radius $R_1$ that is essentially equally great for each point of the first cutting edge portion 348, and the second cutting edge 336 includes also a first cutting edge portion 349 having a first radius $R_1$ that is essentially equally great for each point of the first cutting edge portion 349 of the second cutting edge 336. The first cutting edge 324 includes at least one second cutting edge portion 352 that is plane or has at least one second radius $R_2$ for each point of the second cutting edge portion 352 of the first cutting edge 324. The second cutting edge 336 includes also at least one second cutting edge portion 353 that is plane or has at least one second radius $R_2$ for each point of the second cutting edge portion 353 of the second cutting edge 336. The at least one second radius $R_2$ is greater than the first radius $R_1$. For each one of the first and second cutting edge 324, 336, the at least one second cutting edge portion 352, 353 is situated between the first cutting edge portion 348, 349 and the rotation axis 322, the second cutting edge portion 352, 353 adjoins the first cutting edge portion 348, 349, and the second cutting edge portion 352, 353 is terminated in the rotation axis 322. The second cutting edge portion 352, 353, which is terminated in the rotation axis 322, forms an essentially right angle with the rotation axis 322. In each point of the first and second cutting edge 324, 336 in a transition 358, 359 between the first cutting edge portion 348, 349 and the adjacent second cutting edge portion 352, 353, the cutting edge 324, 336 may have a tangent. In each point of the at least one second cutting edge portion 352, 353 and the first cutting edge portion 348, 349, the respective cutting edge portion 348, 349, 352, 353 may have a tangent that forms a right angle with rotation axis 322 or intersects the rotation axis 322 outside a surface of revolution that is defined by the first cutting edge 324 in its rotation around the rotation axis 322.

Dimensions of the first radius $R_1$ and second radius $R_2$ and the length of the at least one second cutting edge portion 352, 353 along the extension of the respective cutting edge 324, 336 and the relationships between the same for the disclosed devices may correspond to the dimensions and relationships that have been described above for the disclosed milling inserts. However, other dimensions and measures are possible.

In the embodiments described above of the device, the milling cutter body may be manufactured from a material that is softer than the material of the cutting edges. The cutting edges may, e.g., be manufactured from a cemented carbide while the milling cutter body is manufactured from steel. Alternatively, the milling cutter body and the cutting edges are manufactured from the same material.

The radius that the respective cutting edge portion has in the embodiments described above is defined as the distance from a point of the cutting edge to an axis around which the cutting edge portion curves. Each point of the cutting edge, except in the proper rotation axis, has also a radial distance to the rotation axis of the milling cutter body, wherein the radial distance to the rotation axis is lying in a radial plane that is perpendicular to the rotation axis. This radial distance to the rotation axis does not correspond to the radius of the respective cutting edge portion as is stated in the embodiments described above.

The respective milling cutter body in the embodiments described above may be arranged for contour milling, such as precision contour milling of material, e.g. in finishing with cutting depths of approx. 0.2 mm, but also other cutting depths are possible. Other details and surfaces of the above described milling inserts and devices and angles between the same, in addition to those discussed above, may be arranged in ways known to a person skilled in the art.

While the invention has been disclosed with reference to certain preferred embodiments, numerous modifications, alterations, and changes to the described embodiments are possible without departing from the sphere and scope of the invention, as defined in the appended claims and their equivalents thereof. The respective embodiment may, for example, be provided with more or fewer cutting edges, and the respective cutting edge terminated in or adjacent to the center/rotation axis may be provided with a plurality of other cutting edge portions that may have different other radii. Accordingly, it is intended that the invention not be limited to the described embodiments, but that it have the full scope defined by the language of the following claims.

What is claimed is:

1. A milling insert for center cutting milling of material, which milling insert is arranged to be arranged in a seat that is defined by a milling cutter body and situated at a rotation axis defined by the milling cutter body, the milling cutter body being connectable to a rotatable spindle or holder, the milling insert comprising:
   a plurality of cutting edges, where at least one first cutting edge of the plurality of cutting edges is terminated in or adjacent to a center axis that is defined by the milling insert and, when the milling insert is arranged in the seat, intended to coincide with the rotation axis of the milling cutter body, the first cutting edge comprises
      a first cutting edge portion having a first radius from a first axis, wherein the first radius has a distance that is essentially equal for each point of the first cutting edge portion, and
      at least one second cutting edge portion that is plane or has at least one second radius from a second axis for each point of the respective second cutting edge portion, the at least one second radius being greater than the first radius,
   wherein the at least one second cutting edge portion is situated between the first cutting edge portion and the center axis, one of the at least one second cutting edge portion adjoins the first cutting edge portion, and one of the at least one second cutting edge portion is terminated in or adjacent to the center axis.

2. The milling insert according to claim 1, wherein a second cutting edge of the plurality of cutting edges is terminated in or adjacent to the center axis defined by the milling insert, the second cutting edge comprising:
   a first cutting edge portion having a first radius from a first axis, wherein the first radius has a distance that is essentially equal for each point of the first cutting edge portion; and
   at least one second cutting edge portion that is plane or has at least one second radius from a second axis for each point of the respective second cutting edge portion of the second cutting edge, the at least one second radius of the second cutting edge portion of the second cutting edge being greater than the first radius of the first cutting edge portion of the second cutting edge,
   wherein the at least one second cutting edge portion of the second cutting edge is situated between the first cutting edge portion of the second cutting edge and the center axis, one of the at least one second cutting edge portion of the second cutting edge adjoins the first cutting edge portion, and one of the at least one second cutting edge portion of the second cutting edge is terminated in or adjacent to the center axis.

3. The milling insert according to claim 1, wherein the at least one second cutting edge portion has the at least one second radius.

4. The milling insert according to claim 1, wherein the second cutting edge portion, which is terminated in or adjacent to the center axis, forms an essentially right angle with the center axis.

5. The milling insert according to claim 1,
   wherein the first axis and the at least one second axis intersect the center axis.

6. The milling insert according to claim 1, wherein the length of the at least one second cutting edge portion along the extension of the respective cutting edge is at least 1/100 of the first radius.

7. The milling insert according claim 1, wherein the length of the at least one second cutting edge portion along the extension of the respective cutting edge is less than ⅕ of the first radius.

8. The milling insert according to claim 7, wherein the length of the at least one second cutting edge portion along the extension of the respective cutting edge is less than ¹/₁₀ of the first radius.

9. The milling insert according to claim 1, wherein the at least one second radius is 10% greater than the first radius.

10. The milling insert according to claim 9, wherein the at least one second radius is 30% greater than the first radius.

11. The milling insert according to claim 1, wherein the at least one second radius is less than 1000 times the first radius.

12. The milling insert according to claim 11, wherein the at least one second radius is less than ten times the first radius.

13. The milling insert according to claim 12, wherein the at least one second radius is less than four times the first radius.

14. The milling insert according to claim 1, wherein, in each point of the cutting edge in a transition between the first cutting edge portion and the adjacent second cutting edge portion, the cutting edge has a tangent.

15. The milling insert according to claim 1, wherein, in each point of the at least one second cutting edge portion, the at least one second cutting edge portion has a tangent that forms a right angle with the center axis or intersects the center axis outside a surface of revolution that is defined by the first cutting edge in its rotation around the center axis.

16. The milling insert according to claim 1, wherein, in each point of the first cutting edge portion, the first cutting edge portion has a tangent that forms a right angle with the center axis or intersects the center axis outside a surface of revolution that is defined by the first cutting edge in its rotation around the center axis.

17. The milling insert according to claim 1, wherein the milling insert is in the form of a radius end milling insert.

18. The milling insert according to claim 1, wherein the milling insert is in the form of a ball nose end milling insert.

19. The milling insert of claim 1, wherein the first axis is coincident to an axis of a mounting hole of the insert.

20. A tool for center cutting milling of material, comprising:
a milling cutter body that is connectable to a rotatable spindle or holder and defines a rotation axis, where the milling cutter body includes a seat situated at the rotation axis and intended for a milling insert; and
a milling insert arranged in the seat,
wherein the milling insert further comprises
a plurality of cutting edges, where at least one first cutting edge of the plurality of cutting edges is terminated in or adjacent to a center axis that is defined by the milling insert and, when the milling insert is arranged in the seat, intended to coincide with the rotation axis of the milling cutter body, the first cutting edge comprises
a first cutting edge portion having a first radius from a first axis, wherein the first radius has a distance that is essentially equal for each point of the first cutting edge portion, and
at least one second cutting edge portion that is plane or has at least one second radius from a second axis for each point of the respective second cutting edge portion, the at least one second radius being greater than the first radius,
wherein the at least one second cutting edge portion is situated between the first cutting edge portion and the center axis, one of the at least one second cutting edge portion adjoins the first cutting edge portion, and one of the at least one second cutting edge portion is terminated in or adjacent to the center axis.

21. The tool according to claim 20, wherein the tool is in the form of a radius end mill tool.

22. The tool according to claim 20, wherein the tool is in the form of a ball nose end mill tool.

23. A device for center cutting milling of material, comprising:
a milling cutter body that is connectable to a rotatable spindle or holder and defines a rotation axis, the milling cutter body including a plurality of cutting edges, where at least one first cutting edge of the plurality of cutting edges is terminated in or adjacent to the rotation axis of the milling cutter body, the first cutting edge comprising
a first cutting edge portion having a first radius from a first axis, wherein the first radius has a distance that is essentially equal for each point of the first cutting edge portion, and
at least one second cutting edge portion that is plane or has at least one second radius from a second axis for each point of the respective second cutting edge portion, the at least one second radius being greater than the first radius,
wherein the at least one second cutting edge portion is situated between the first cutting edge portion and the rotation axis, one of the at least one second cutting edge portion adjoins the first cutting edge portion, and one of the at least one second cutting edge portion is terminated in or adjacent to the rotation axis.

24. The device according to claim 23, wherein a second cutting edge of the plurality of cutting edges is terminated in or adjacent to the rotation axis of the milling cutter body, the second cutting edge comprising:
a first cutting edge portion having a first radius from a first axis, wherein the first radius has a distance that is essentially equal for each point of the first cutting edge portion; and
at least one second cutting edge portion that is plane or has at least one second radius from a second axis for each point of the respective second cutting edge portion of the second cutting edge, the at least one second radius of the second cutting edge portion of the second cutting edge being greater than the first radius of the first cutting edge portion of the second cutting edge,
wherein the at least one second cutting edge portion of the second cutting edge is situated between the first cutting edge portion of the second cutting edge and the rotation axis, one of the at least one second cutting edge portion of the second cutting edge adjoins the first cutting edge portion, and one of the at least one second cutting edge portion of the second cutting edge is terminated in or adjacent to the rotation axis.

25. The device according to claim 23, wherein the at least one second cutting edge portion has the at least one second radius.

26. The device according to claim 23, wherein the second cutting edge portion, which is terminated in or adjacent to the rotation axis, forms an essentially right angle with the rotation axis.

27. The device according to claim 23, wherein the first axis and the at least one second axis intersect the rotation axis.

28. The device according to claim 23, wherein the length of the at least one second cutting edge portion along the extension of the respective cutting edge is at least ¹/₁₀₀ of the first radius.

29. The device according to claim 23, wherein the length of the at least one second cutting edge portion along the extension of the respective cutting edge is less than 1/5 of the first radius.

30. The device according to claim 29, wherein the length of the at least one second cutting edge portion along the extension of the respective cutting edge is less than 1/10 of the first radius.

31. The device according to claim 23, wherein the at least one second radius is 10% greater than the first radius.

32. The device according to claim 31, wherein the at least one second radius is 30% greater than the first radius.

33. The device according to claim 23, wherein the at least one second radius is less than 1000 times the first radius.

34. The device according to claim 33, wherein the at least one second radius is less than ten times the first radius.

35. The device according to claim 34, wherein the at least one second radius is less than four times the first radius.

36. The device according to claim 23, wherein, in each point of the cutting edge in a transition between the first cutting edge portion and the adjacent second cutting edge portion, the cutting edge has a tangent.

37. The device according to claim 23, wherein, in each point of the at least one second cutting edge portion, the at least one second cutting edge portion has a tangent that forms a right angle with the rotation axis or intersects the rotation axis outside a surface of revolution that is defined by the first cutting edge in its rotation around the rotation axis.

38. The device according to claim 23, wherein, in each point of the first cutting edge portion, the first cutting edge portion has a tangent that forms a right angle with the rotation axis or intersects the rotation axis outside a surface of revolution that is defined by the first cutting edge in its rotation around the rotation axis.

39. The device according to claim 23, wherein the device is in the form of a radius end mill tool.

40. The device according to claim 23, wherein the device is in the form of a ball nose end mill tool.

\* \* \* \* \*